March 3, 1970     W. P. BANKS ET AL     3,498,900
CORROSION-ANALYTICAL MONITORING APPARATUS
Filed Sept. 25, 1967     2 Sheets-Sheet 1
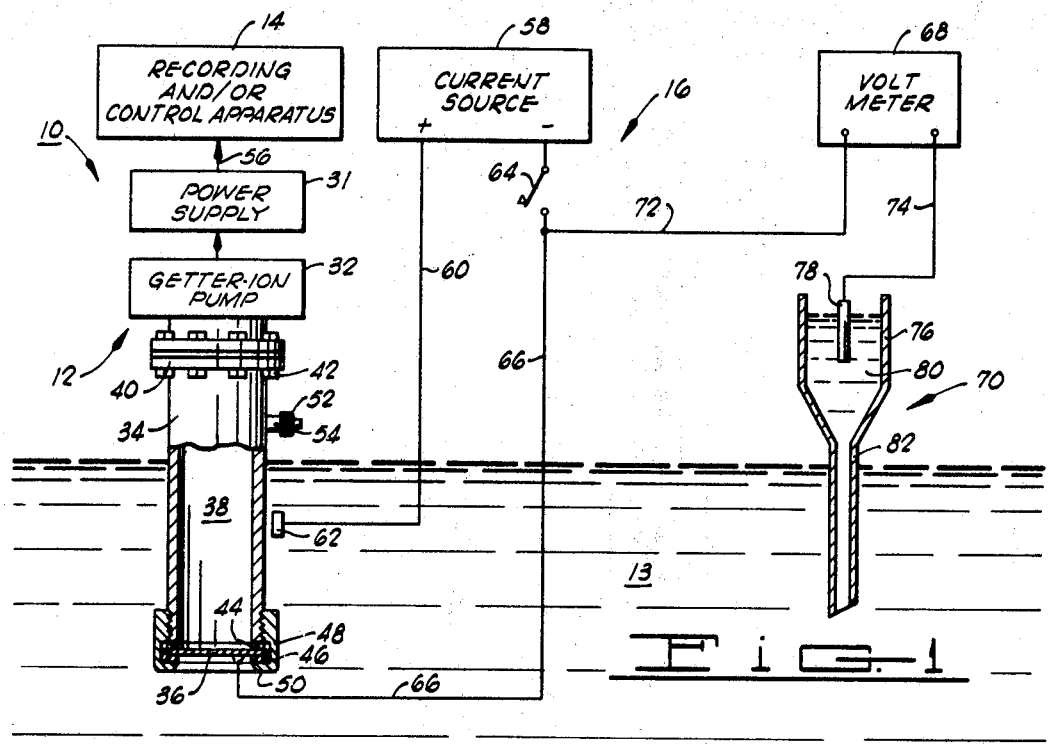
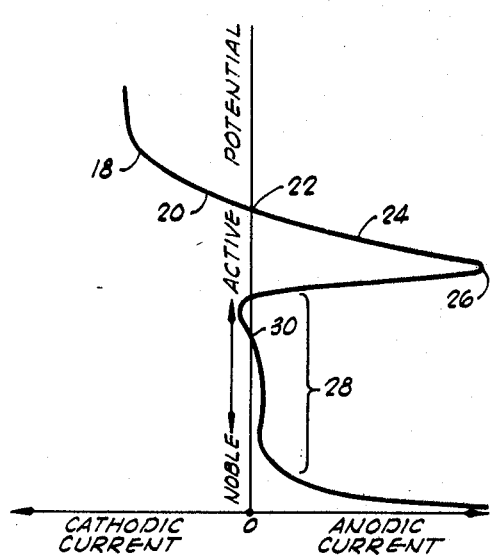
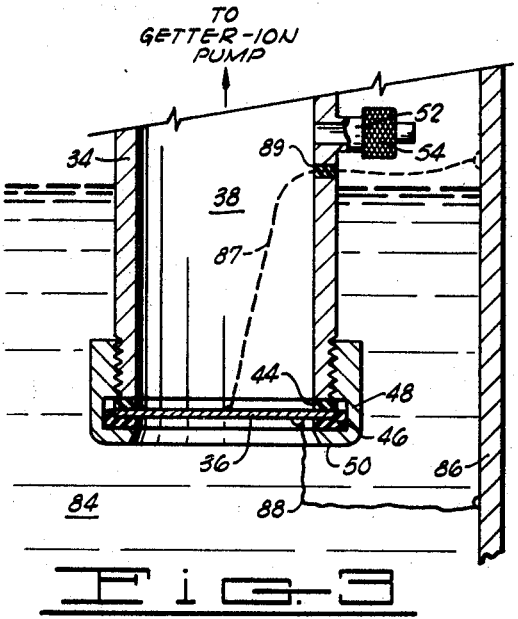
INVENTORS
WILLIAM P. BANKS,
DONALD H. OERTLE &
BY FREDERICK U. RADD
William J. Miller
ATTORNEY

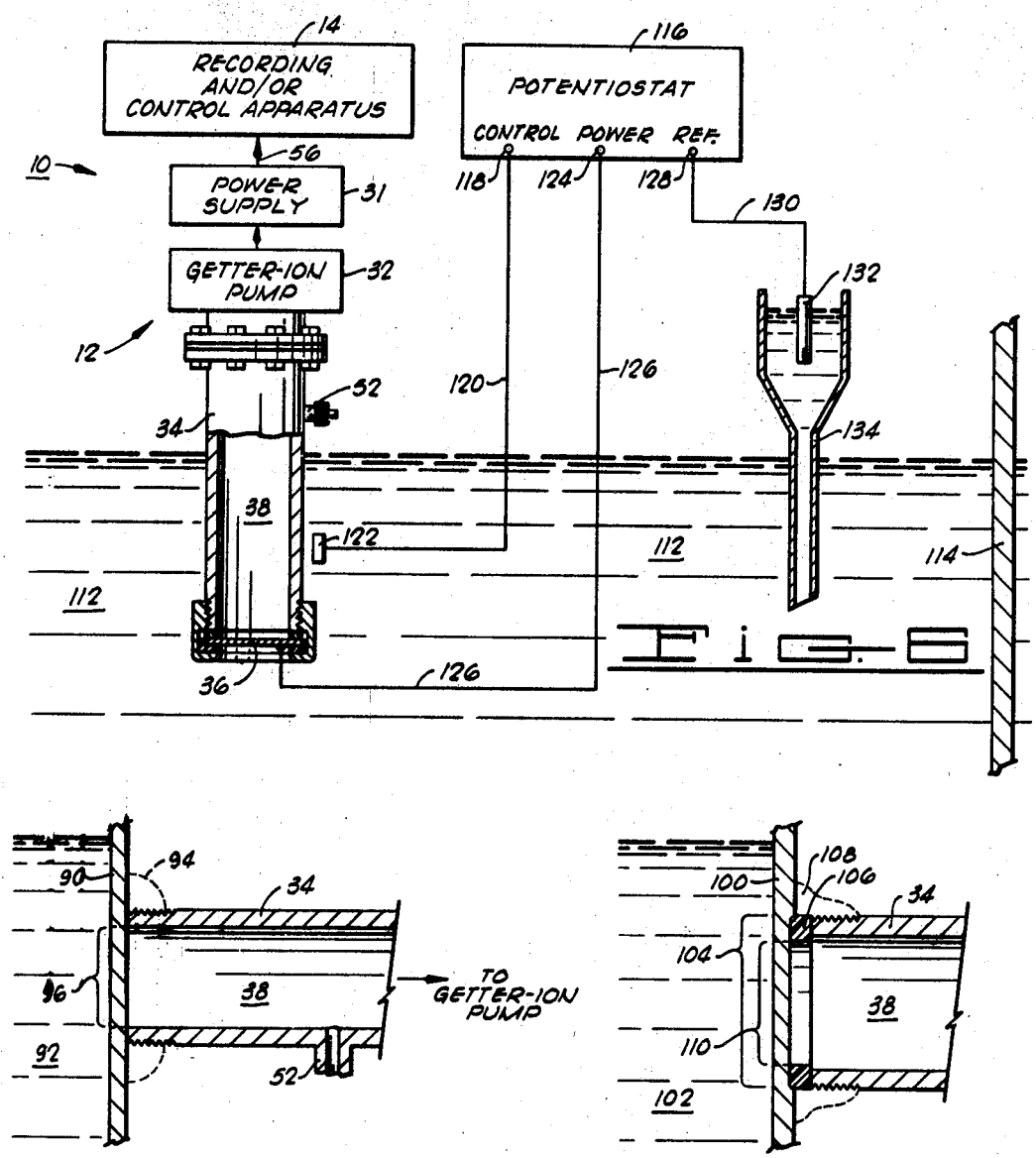

United States Patent Office 3,498,900
Patented Mar. 3, 1970

3,498,900
CORROSION-ANALYTICAL MONITORING APPARATUS
William P. Banks, Donald H. Oertle, and Frederick J. Radd, Ponca City, Okla., assignors to Continental Oil Company, Ponca City, Okla., a corporation of Delaware
Filed Sept. 25, 1967, Ser. No. 671,536
Int. Cl. G01n 17/00, 27/70
U.S. Cl. 204—195   14 Claims

ABSTRACT OF THE DISCLOSURE

Apparatus for enabling accurate generation of ion currents from hydrogen which diffuses through a diaphragm in contact with a corrosive fluid; the apparatus consisting of a specific design of hydrogen diffusible plate which is retained within a probe member and electrically connected to allow control of the corrosive activity such that realistic corrosion readings in either the active or passive state may be obtained. The apparatus capability is further extended to provide the accurate corrosion rates as read from metals while undergoing anodic passivation, cathodic protection or whatever the corrosion safeguard process.

CROSS-REFERENCE TO RELATED APPLICATION

The instant application is particularly related to the method and apparatus disclosed in U.S. application, Ser. No. 670,317 entitled "Corrosion and Composition-Analytical Monitoring Apparatus," filed on Sept. 25, 1967 in the name of D. H. Oertle and F. J. Radd and assigned to the present assignee.

BACKGROUND OF THE INVENTION

Field of the invention

The invention relates generally to corrosion monitoring apparatus and, more particularly, but not by way of limitations, it relates to improvements in getter-ion pump input probes and their associated gas diffusible plates, the present improvements being directed to obtaining realistic corrosion rates at all levels of corrosive activity due to potential variations imposed upon the diaphragm.

SUMMARY OF THE INVENTION

The present invention contemplates corrosion detection devices applied to variable potential electrochemical systems. In a more limited aspect, the invention consists of particular alternative forms of getter-ion pump probe designs and electrical connections for activating a hydrogen diffusible plate to a potential which is an actively corroding potential for a predetermined metal-corrosive fluid system, thus to obtain a more representative, true corroding rate for the particular system in either its active or passive condition. In one form, such activation of the hydrogen diffusible plate may be effected by insulating the plate from the pump probe so that the hydrogen diffusible plate can either be shorted to the metallic vessel containing the particular corrosive fluid or it can be separately activated by application of anodic or cathodic current.

The invention contemplates a still further refinement whereby the corrosion detector, including an activated hydrogen diffusible plate, is employed in conjunction with an anodic passivation system, a cathodic protection system, or such related device, so that the apparatus is able to determine the effectiveness of cathodic and/or anodic protection in reducing the corrosion rate of a particular metal or alloy in a corrosive medium.

Therefore, it is an object of the present invention to provide a corrosion detector which will indicate the true corrosion rate of a metal or alloy when in an active or a passive state.

It is also an object of the present invention to provide apparatus for determining the effectiveness of cathodic and/or anodic corrosion protection.

It is a further object of the invention to provide apparatus for obtaining realistic corrosion rates for those types of metal-corrosive fluid systems which can assume either one of two potentials, one corresponding to an actively corroding rate and the other corresponding to a passive state.

Finally, it is an object of the present invention to provide a corrosion detection system which has versatile application and can be employed in numerous metal-corrosive fluid systems to obtain the actual, true corroding rates of the metal under various applied potentials.

Other objects and advantages of the invention will be evident from the following detailed description when read in conjunction with the accompanying drawings which illustrate the invention.

BRIEF DESCRIPTION OF THE DRAWINGS

FIG. 1 illustrates the invention in pictorial block diagram with the getter-ion pump probe shown in partially cut-away elevation;

FIG. 2 is a graph depicting corrosive activity for an exemplary metal-corrosive fluid system;

FIG. 3 is a vertical section of a pump probe as employed in an alternative usage;

FIG. 4 is an alternative form of getter-ion pump probe as shown in vertical section;

FIG. 5 is a vertical section showing an alternative construction of the pump probe of FIG. 4; and FIG. 6 is a pictorial block diagram of the corrosion detector as employed with an anodic passivation system.

DESCRIPTION OF THE PREFERRED EMBODIMENT

As shown in FIG. 1, a corrosion detection apparatus 10 consists of a measuring apparatus 12 immersed in corrosive fluid 13, recording and/or control apparatus 14, and activation circuitry 16. The actiavtion circuitry 16 finds particular application when used with those metal-corrosive fluid systems which are characterized by multiple stable potentials, both corrosive and non-corrosive (or very slightly corrosive), e.g. unprotected mild steel containing such as nitrogen fertilizer solutions or pulp liquors.

The graph of FIG. 2 depicts a characteristic form of polarization curve as would be obtained for the above mild steel-corrosive fluid system. FIG. 2 represents a semi-log plot of potential versus current density, the current density being plotted in milli-amperes per square inch and the potential in milli-volts as derived with respect to a reference half-cell at predetermined temperature. The potential extends from positive to negative as the electrochemical condition of the mild steel progresses from the noble to the more active conditions. This is in keeping with the standard convention as adopted by The International Union of Chemistry and Applied Physics, as the convention specifies that potentials moving from noble to active should progress from positive to negative.

The polarization curve 18 consists of a first region 20 of cathodic current which rapidly falls to zero at point 22, a potential which is defined as the natural corrosion potential of the particular mild steel-corrosive fluid system. At still more noble potentials, the polarization curve consists of a rapidly rising anodic current as shown by line segment 24 which passes through an abrupt peak or Flade arrest point 26 and on into the passive region 28. The polarization curve 18 then extends in hyperbolic manner to a trans-passive region at the most noble potentials. The polarization curve 18 serves to indicate that the particular mild steel-corrosive fluid system will have a first stable corroding potential as shown by point 22 on the potential axis and a second stable passive potential 30 will also exist. Thus, the activation circuitry 16 of FIG. 1 can serve to adjust the stable potential of the mild steel so that a true corrosion rate will be obtained for a particular active or passive condition.

Referring again to FIG. 1, the corrosion detection apparatus 10 consists of measuring apparatus 12 which is generally similar to that of the aforementioned co-pending patent application Ser. No. 670,317. That is, the measuring apparatus 12 utilizes a conventional form of power supply 31 and getter-ion pump 32 coupled to a probe member 34. The probe member 34 includes a hydrogen diffusible membrane or diaphragm 36 which is sealingly connected over its lower end and it defines a cavity 38 therein. The upper end of probe member 34 is connected in air-tight manner as, for example, by the flange connection 40 secured by multiple fasteners 42 to the input conduit to getter-ion pump 32. Getter-ion pump 32 may be any of various commercially available pumps.

The hydrogen diffusible diaphragm 36 is retained over the lower opening of cavity 38 in electrically insulated manner so that it exhibits only its own independent potential characteristic. Thus, diaphragm 36 is secured in position by means of an upper gasket 44 and a lower gasket 46, each formed from electrically insulative material, and the entire assembly is held in air-tight engagement by the threaded cap ring 48. Cap ring 48 is formed to have a radially inwardly bent flange 46 which then secures the insulating gasket 46 and, therefore, the diaphragm 36 while allowing contact between the outer surface of diaphragm 36 and corrosive fluid 13. A conduit 52, which may be sealed closed by means of a screw valve 54, provides a vacuum connection whereby cavity 38 may be evacuated. In most instances, the cavity 38 can be evacuated and sealed closed; however, some uses may require that a roughing pump be permanently connected as, for example, where the hydrogen diffusible diaphragm 36 may be periodically replaceable with diaphragms of different substance or metallic composition.

Getter-ion pump 32 performs ionization pumping of hydrogen which permeates through diaphragm 36 and then migrates along cavity 38. Getter-ion pump 32 is energized by the power supply 31 which also provides an electrical output on lead 56 which is a time-analog equivalent of the ion current resulting from the evacuation of hydrogen by getter-ion pump 32. The ion current output on lead 56 is then applied to the recording and/or control apparatus 14. The getter-ion pump 32 and power supply 31 as well as the various recording and/or control functions are more specifically set forth in the aforementioned related U.S. patent application Ser. No. 670,317.

The activating circuitry 16 enables derivation of a true corrosion rate for a given metal, of which membrane or diaphragm 36 is formed, as it is situated in contact with the corrosive fluid 13. Thus, for strictly testing procedure, a hydrogen diffusible diaphragm 36 of predetermined metal may be placed in the test environment; however, in operation usage, the vessel or reactor or such (not shown) which contains the corrosive fluid 13 may be formed from the same metal or alloy as the diaphragm 36.

The activating circuitry 16 consists of a current source 58, such as a suitable battery array. Current source 58 provides a positive output on lead 60 to an auxiliary electrode 62, which may be formed from platinum or other inert, conductive material and positioned within corrosive fluid 13 proximate the detection apparatus 10. The negative terminal of current source 58 is applied through an energizing switch 64 via lead 66 which is connected in conductive relationship to the hydrogen diffusible diaphragm 36.

A volt meter 68 is connected in parallel between the negative side of current source 58, lead 66, and a potential reference assembly 70 by means of leads 72 and 74. The potential reference assembly 70 consists of a suitable ionic coupler or bridge 76 which is adapted to receive a reference electrode 78 in a caustic solution 80. The ionic bridge 76 may comprise a salt bridge type of electrochemical juncture wherein a solution 80 such as potassium chloride (KCl) would be placed in contact with the reference electrode 78 and also in contact with the corrosive fluid 13 through a suitable capillary or weeping tube extension 82. There are various equivalent forms of ionic coupling structure which may be suitably employed.

In operation, the detection apparatus 10 is assembled with a hydrogen diffusible diaphragm 36 of predetermined metal and it is placed in corrosive contact with the corrosive fluid 13. A previously known polarization curve, such as that shown in FIG. 2, for the particular metal-corrosive fluid system may be relied upon to set the system into proper or desired corrosion for the purposes of taking the measurements. Thus, voltmeter 68 can be read in milli-volts to determine the stable potential at which the system exists, that is, whether at an actively corroding or stable non-corroding point of the polarization curve 18 in FIG. 2. In the event that the milli-volt reading of voltmeter 68 indicates the stable point 22, the corrosion is proper or as desired for the purpose of quantitatively determining corrosion at that point. The hydrogen will then diffuse through the diaphragm 36, in proportion to the amount of corrosion, and into the evacuated cavity 38 whereupon it migrates into the getter-ion pump 32 and is thereby removed from within the cavity 38. The electrical output from power supply 31 on lead 56 provides current flow proportional to the ion current and this may be recorded or otherwise employed for control purposes in the recording and/or control apparatus 14.

In the event that the metal-corrosive fluid system goes to the stable point 30, as indicated on polarization curve 18 (FIG. 2), the switch 64 can be closed to pass a portion of cathodic current through lead 66 to the hydrogen diffusible diaphragm 36. A short burst of such cathodic current will quickly bring the metal-corrosive fluid system up to the actively corroding point 22 (FIG. 2) whereupon the switch 64 can be opened and the proper corrision measurements can be taken by means of measuring apparatus 12 and the control apparatus 14. For reading quantitative corrosion values over a period of time, it should be remembered that the metal-corrosive fluid system may slip back to the more noble stable potential 30 (FIG. 2) and that the current source 58 must once again be energized to apply a burst of cathodic current via lead 66 to the hydrogen diffusible diaphragm 36. Such periodic application may or may not be necessary and the proper operation and control comes within the skill and experience of the equipment operator.

The structure of FIG. 3 illustrates one manner of connecting the getter-ion pump probe 34, with an insulated hydrogen diffusible diaphragm 36, into a reactor vessel, pipeline or such to obtain more realistic corrosion rates in field applications. Thus, the pump probe 34 is immersed in a corrosive fluid 84 as contained within a metallic vessel 86. Pump probe 34 is of the same construction as shown in FIG. 1 with the hydrogen diffusible metal diaphragm 36 connected in electrically insulated and sealed relationship by means of the upper and lower gaskets 44 and 46 and the threaded cap ring 48. The hydrogen diffusible diaphragm 36 then effuses hydrogen in proportion to the amount of corrosive activity taking place at its exposed surface.

The hydrogen diffusible diaphragm 36 is connected by an electrical conductor 88 to the vessel 86. The plate 36 and vessel 86 are thus maintained at the same potential so that they will corrode at the same rate, this rate being indicated by the migration of hydrogen through cavity 38 to the getter-ion pump and recording apparatus. It is found to be preferable that the hydrogen diffusible diaphragm 36, vessel 86, and even the wire or conductor 88 be constructed from the same metal or alloy, and this ensures a corrosion monitoring apparatus which provides extremely accurate results. Other dissimilar metals can be used, however, by taking the differences into account and allowing for such in the final index of corrosive activity. An alternative connection is shown as dash-line 87. Thus, a connecting wire can be led up through cavity 38 and through a sealed packing 89 to vessel 86, entirely out of contact with fluid 84.

FIG. 4 shows a further modification of the probe design wherein a corroding vessel wall itself is used as the hydrogen diffusible plate in the probe of the corrosion detector. Thus, the getter-ion pump probe 34 is brought in contact with the outside surface of a metallic vessel 90 which contains a corrosive fluid 92. Sealing means may be provided to insure an air-tight coupling between probe member 34 and the vessel 90. For example, an internally threaded metal ring 94 may be welded in sealed, air-tight engagement to the vessel 90 so that it can receive the probe member 34 in air-tight affixure. Thus, the probe structure of FIG. 4 enables the incorporation of another form of hydrogen diffusible diaphragm 96 which can provide hydrogen input to probe cavity 38 in response to corrosive activity, and which is constructed from the preferred same metal or alloy such that realistic or true corrosion rates can be derived from the ion current output of the getter-ion pump.

Still another alternative form of probe assembly is shown in FIG. 5. A metallic vessel 100 containing a corrosive fluid 102 is formed to have a section 104 of preselected, uniform thickness which enables optimum hydrogen diffusion (shown here as a thinned-down portion) an insulative gasket 106 may then be positioned about the outside of vessel wall section 104 with probe member 34 positioned thereon, and a member 108 secures the probe assembly to the vessel 100 in sealed relationship. The member 108 may be, for example, an epoxy potting compound or such having electrical insulative properties as well as extreme high strength.

The probe member of FIG. 5 provides still another type of probe wherein a hydrogen diffusible diaphragm, section 110 of vessel 100, constructed of the same metal as the vessel, provides the hydrogen diffusion input to a cavity 38 within probe member 34. The similarity of metal or alloy enables more realistic corrosion readings as derived from the ion current output of the getter-ion pump (as shown in FIG. 1).

DESCRIPTION OF AN ALTERNATIVE EMBODIMENT

The apparatus of FIG. 6 shows a specialized use of the corrosion detection apparatus as it is employed in determining the effectiveness of a corrosion protection system. Thus, the corrosion detection apparatus 10 (similar to that of FIG. 1) which includes an insulated hydrogen diffusible diaphragm 36, is immersed in a corrosive fluid 112 as contained within a test vessel 114 or such. The hydrogen diffusible diaphragm 36 will be formed from a selected metal or alloy which is the subject of the corrosion protection test, and a direct indication of corrosion activity will be indicated by the ion current from getter-ion pump 32 and power supply 31 on output lead 56 to the recording and/or control apparatus 14.

The testing procedure further utilizes a potentiostat 116 which is employed to provide controlled polarization, either anodically or cathodically, of the hydrogen diffusible plate 36. Such a potential control insturment serves to maintain a constant potential working electrode, either a cathode or an anode, with respect to a reference half-cell. Thus, potentiostat 116 has a control output 118 which is connected via lead 120 to an auxiliary electrode 122 positioned proximate the probe member 34 in contact with corrosive fluid 112. A second or power terminal 124 of potentiostat 116 is connected via a lead 126 to the hydrogen diffusible diaphragm 36 and, finally, a third terminal 128 of potentiostat 116 is connected by a lead 130 to a reference half-cell 132. The reference electrode or standard half-cell 132 may be saturated calomel half-cell which is electro-chemically coupled by a suitable ionic bridge 134 to the corrosive fluid 112. The ionic bridge 134 may take the form of the bridge 70 of FIG. 1 or it may be one of various equivalent structures which also form a suitable electro-chemical juncture.

In operation, a hydrogen diffusible diaphragm 36 of selected metal or alloy may be polarized to any desired potential and the corrosive activity at the particular potential may be detected through measuring apparatus 12 such that proportional ion current output on lead 56 will be suitably recorded. The potentiostat 116 may be set to apply power on lead 126 such that hydrogen diffusible diaphragm 36 is polarized either anodically or cathodically. Thus, a reference potential as derived from half-cell 132 provides a reference input to potentiostat 116 so that it will tend to maintain the potential of hydrogen diffusible diaphragm 36 close about a predetermined potential. Such operation enables a determination of the effectiveness of anodic and/or cathodic protection and it enables an instantaneous determination for any selected potential or potential range.

The foregoing novel corrosion monitoring apparatus enables the obtaining of realistic corrosion rates at active or passive potentials for a great number of diverse metal-corrosive fluid systems. In addition, the corrosion detecting apparatus of the present invention may be employed to determine the actual effectiveness of anodic passivation systems, cathodic protection systems, chemical inhibitor injector apparatus, and other forms of corrosion protection by controlling the corrosive environment of a metal-corrosive fluid system in a predetermined manner while detecting and recording the quantitative measure of corrosive activity. The apparatus finds many other uses both in field corrosion protection systems as well as in laboratory uses and general research work.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. Apparatus for monitoring corrosion in a metal-corrosive fluid system, comprising:
    diaphragm means which is hydrogen diffusible;
    probe means defining an evacuated cavity and receiving said diaphragm means in sealing engagement over one end, said one end being placed in contact with said corrosive fluid;
    detection means comprising getter-ion pump means connected in sealing engagement to the other end of said probe means to detect hydrogen migrating from said diaphragm means through said probe means cavity, said means providing an electrical output proportional to the amount of said hydrogen;
    control means receiving said electrical output; and
    means for maintaining said diaphragm means at a potential which causes corrosive activity whereby said control means receives an output equivalent to a true corrosion rate.

2. Apparatus as set forth in claim 1 wherein said means for maintaining comprises:
    insulating means connected in sealed relationship between said diaphragm means and said probe means; and
    means for applying cathodic current to said diaphragm means with respect to the corrosive fluid so that it is maintained at an actively corroding potential.

3. Apparatus as set forth in claim 2 which is further characterized to include:
    half-cell means in electrochemical contact with the corrosive fluid; and meter means connected between said means for applying and said half-cell means to indicate the potential of said diaphragm means.

4. Apparatus as set forth in claim 1 wherein said means for maintaining comprises:
   metallic vessel means containing said corrosive fluid; and
   metallic conductor means connected between said vessel means and said diaphragm means.

5. Apparatus as set forth in claim 1 wherein said diaphragm means comprises:
   a portion of metallic vessel means which contains said corrosive fluid.

6. Apparatus as set forth in claim 1 wherein said probe means comprises:
   a hollow, generally cylindrical enclosure;
   first insulative gasket means positioned over said one end;
   second insulative gasket means positioned over said one end to hold said diaphragm means in sealed engagement to said first insulative gasket means; and
   cap ring means for securing said first and second insulated gasket means and said diaphragm means in air-tight engagement over said one end of said enclosure.

7. Apparatus as set forth in claim 6 wherein said means for maintaining comprises:
   means for applying cathodic current to said diaphragm means with respect to the corrosive fluid so that it is maintained at an actively corroding potential;
   half-cell means in electrochemical contact with the corosive fluids; and
   meter means connected between said means for applying and said half-cell means to indicated the potential of said diaphragm means with respect to the corrosive fluid.

8. Apparatus as set forth in claim 6 wherein said means for maintaining comprises:
   means for applying anodic current to said diaphragm means with respect to the corosive fluid;
   half-cell means in electrochemical contact with said corosive fluid; and
   meter means connected between said means for applying and said half-cell means.

9. Apparatus as set forth in claim 1 wherein said means for maintaining comprises:
   insulating means connected in sealed relationship between said diaphragm means and said proble means;
   half-cell means in electrochemical contact with the corosive fluid;
   auxiliary electrode means in contact with said corrosive fluid;
   potential control means connected to said auxiliary electrode, said half-cell means and to said diaphragm means to maintain the potential of the said diaphragm means close about a predetermined potential.

10. Apparatus as set forth in claim 1 wherein said means for maintaining comprises:
    insulating means connected in sealed relationship between said diaphragm means and said probe means;
    metallic vessel means containing said corosive fluid;
    metallic conductor means connected between said metallic vessel means and said diaphragm means.

11. Apparatus as set forth in claim 1 wherein said means for maintaining comprises:
    metallic vessel means containing said corrosive fluid, a portion of said vessel means also being said diaphragm means.

12. Apparatus as set forth in claim 1 wherein said means for maintaining comprises:
    insulating means connected in sealed relationship between said diaphragm means and said probe means; and
    metallic vessel means containing said corrosive fluid, a portion of said vessel means also being said diaphragm means.

13. Apparatus as set forth in claim 1 wherein said means for maintaining comprises:
    half-cell means in electrochemical contact with said corosive fluid;
    potentiostat means receiving the output of said half-cell means and being connected to apply varying amounts of current to said diaphragm means in proportion to variations of the voltage output of said half-cell means.

14. Apparatus as set forth in claim 1 wherein said means for maintaining comprises:
    insulating means connected in sealed relationship between said diaphragm means and said probe means; and
    means for applying anodic current to said diaphragm means with respect to said corrosive fluid.

References Cited

UNITED STATES PATENTS

| 2,882,212 | 4/1959 | Beard | 204—195 |
| 2,886,497 | 5/1959 | Butler | 204—195 |
| 3,357,903 | 12/1967 | Lawrence | 324—33 |

OTHER REFERENCES

Norton, Jour. of Applied Physics, vol. 11, No. 4, April 1940, pp. 262–7.

Bloom et al, Corrosion, vol. 13, No. 5, May, 1957, pp. 27–32.

T. TUNG, Primary Examiner

U.S. Cl. X.R.

204—1; 324—29, 33, 71